United States Patent
Thakkar et al.

(10) Patent No.: US 12,530,144 B2
(45) Date of Patent: Jan. 20, 2026

(54) SYSTEM AND METHOD FOR ESTIMATION OF ERROR BOUNDS FOR FILE SIZE CALCULATIONS USING MINHASH IN DEDUPLICATION SYSTEMS

(71) Applicant: DELL PRODUCTS L.P., Round Rock, TX (US)

(72) Inventors: Smriti Thakkar, San Jose, CA (US); Kao-Feng Hsieh, San Mateo, CA (US); Zachary Tom, Seattle, WA (US); Tony Wong, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 33 days.

(21) Appl. No.: 18/309,463

(22) Filed: Apr. 28, 2023

(65) Prior Publication Data
US 2024/0361937 A1 Oct. 31, 2024

(51) Int. Cl.
*G06F 3/06* (2006.01)
(52) U.S. Cl.
CPC .......... *G06F 3/0641* (2013.01); *G06F 3/0619* (2013.01); *G06F 3/0689* (2013.01)
(58) Field of Classification Search
CPC ..... G06F 3/0641; G06F 3/0619; G06F 3/0689
See application file for complete search history.

(56) References Cited

U.S. PATENT DOCUMENTS

| | | | | |
|---|---|---|---|---|
| 5,968,109 | A | * | 10/1999 | Israni ...................... G06F 16/29 707/999.102 |
| 9,424,285 | B1 | * | 8/2016 | Condict .................. G06F 3/067 |
| 2016/0269424 | A1 | * | 9/2016 | Chandola .............. G06F 21/552 |
| 2018/0074745 | A1 | * | 3/2018 | Harnik ..................... G06F 3/067 |
| 2022/0067779 | A1 | * | 3/2022 | Sheppard ........... G06Q 30/0246 |
| 2022/0179574 | A1 | * | 6/2022 | Dar ........................ G06F 3/0641 |
| 2023/0119183 | A1 | * | 4/2023 | Wong .................... G06F 16/137 707/822 |
| 2023/0205736 | A1 | * | 6/2023 | Horev ................... G06F 16/152 707/747 |

* cited by examiner

*Primary Examiner* — Eric T Loonan
(74) *Attorney, Agent, or Firm* — WOMBLE BOND DICKINSON (US) LLP

(57) ABSTRACT

A system and method for an estimation of error bounds for file size calculations using MinHash in deduplication systems. The system includes one or more processors to determine a similarity score between the first file and the second file. The one or more processors are further to determine a size estimation of a combination of the first and second files based on the similarity score. Finally, the one or more processors are to determine a maximum error for the size estimation of the combination of the first and second files, wherein the first and second file are to be combined via deduplication and have at least one shared data segment.

19 Claims, 9 Drawing Sheets

(A) k = 4096

(B) k = 1024

(C) k = 512

(D) k = 128

SYSTEM AND METHOD FOR ESTIMATION OF ERROR BOUNDS FOR FILE SIZE CALCULATIONS USING MINHASH IN DEDUPLICATION SYSTEMS

FIELD OF THE INVENTION

Embodiments of the present invention relate generally to data storage systems. More particularly, embodiments of the invention relate to estimation of error bounds for file size calculations using MinHash in deduplication data storage systems.

BACKGROUND

For many data storage systems, storage providers, enterprises and other organizations may need to have an accurate understanding of the size of files stored in their systems. For example, some storage providers may rent or lease storage space to third parties (e.g., tenants) who store their data in the storage systems. In many installations, multiple tenants share the same file system provided by the storage provider. In these situations, it is important to compute the size of a subset of a collection of files for charge back purposes. As part of this, typical deduplication systems find similar data chunks in the subset of files to save space and increase the deduplication rate in a deduplication system.

In a normal file system, the total size of a subset of files, i.e., two files illustrated for simplicity, F1 and F2, is simply the sum of their sizes, |F1|+|F2|. However, in a deduplication file system, common data segments are shared, and the total physical size of the two files, F1 and F2, is |F1 U F2|=|F1|+|F2|−|F1∩F2|.

There are various approaches for measuring file similarity between two files to thereby determine the size of the deduplicated files. However, some approaches include an inherent error factor. Therefore, there is a need for an improved method for determining an upper bound of the error inherent in determining the size of the deduplicated files when using MinHashes.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
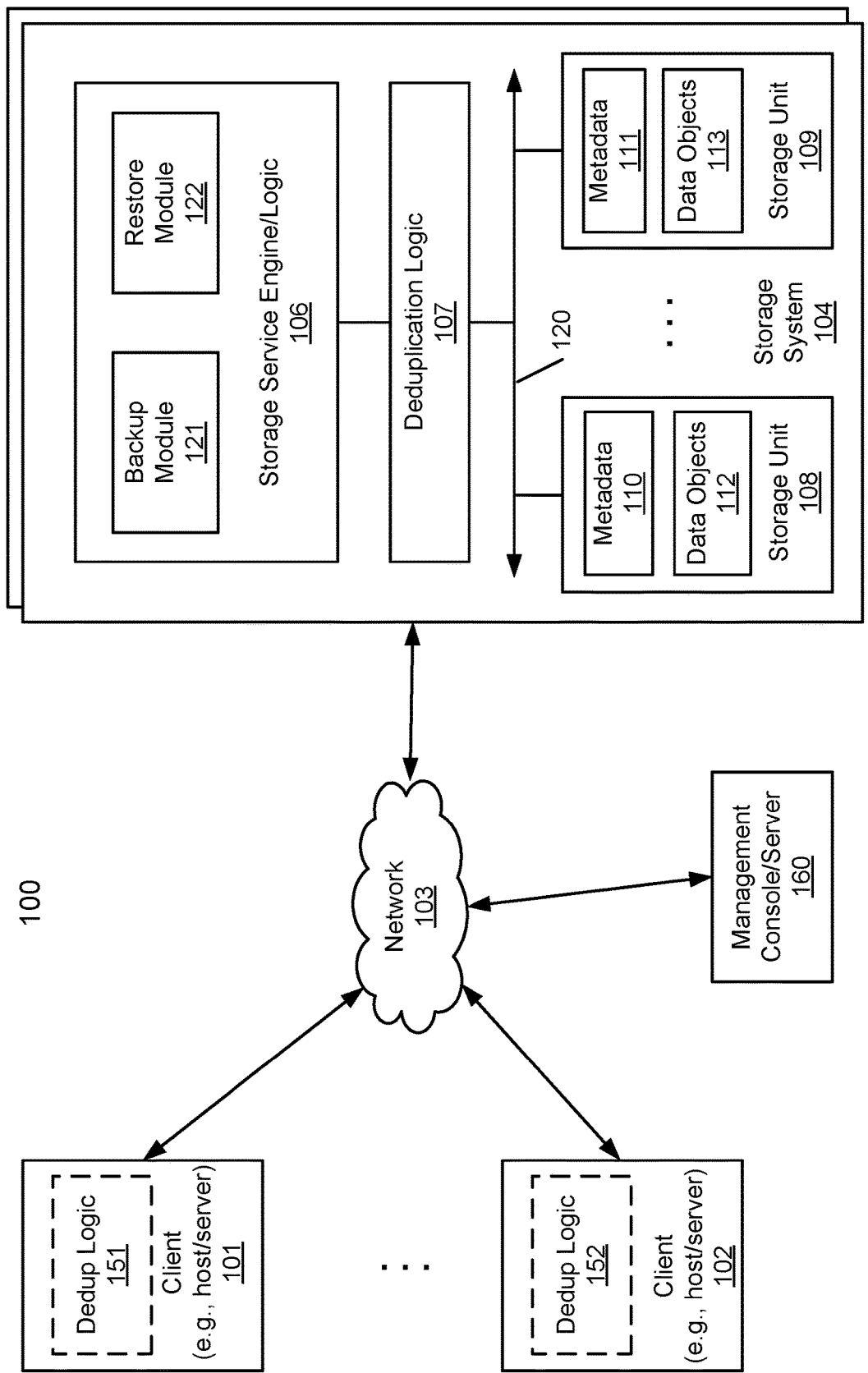
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the present disclosure calculates an upper bound error estimations for the union size of two or more datasets or files calculated using the MinHash (or the min-wise independent permutations locality sensitive hashing scheme) technique. The purpose of the MinHash technique is to efficiently estimate the Jaccard similarity coefficient, which is a commonly used indicator of the similarity between two sets of elements. The MinHash technique's many use cases include identifying documents that are similar to each other as a cluster of documents with similar attributes and identifying which documents are completely similar to each other as duplicate documents which are to be deleted from the cluster.

If U is a set and A and B are subsets of U, then the Jaccard similarity coefficient is defined to be the ratio of the number of elements of their intersection to the number of elements of their union, which may be expressed in the equation for the Jaccard similarity coefficient as:

$$J(A, B) = |A \cap B|/|A \cup B|.$$

The Jaccard similarity coefficient's value equals 0 when the two sets of elements are disjoint, equals 1 when the two sets of elements are equal, and otherwise equals between 0 and 1. Two sets of elements are more similar, such that they have relatively more elements in common, when the value of their Jaccard similarity coefficient is closer to the value of 1 than to the value of 0. The goal of the MinHash technique is to estimate the Jaccard similarity coefficient quickly, without explicitly computing the intersection of the sets of elements and union of the sets of elements.

If h is a hash function that maps the members of the set U to distinct integers, and perm is a random permutation of the elements of the set U, then hmin(S) is defined for any set S as the minimal member of S with respect to h∘perm—that is, the member x of S with the minimum value of h(perm (x)). In cases where the hash function used is assumed to have pseudo-random properties, the random permutation is not used.

Applying hmin to both A and B, and assuming no hash collisions, the values are equal (hmin(A)=hmin(B)) if and only if among all elements of A∪B, the element with the minimum hash value lies in the intersection A∩B. The probability of this being true is exactly the Jaccard similarity coefficient, therefore:

$$Pr[hmin(A) = hmin(B)] = J(A, B).$$

The probability that hmin(A)=hmin(B) is true is equal to the Jaccard similarity coefficient J(A, B), assuming drawing perm from a uniform distribution. If r is the random variable that equals 1 when hmin(A)=hmin(B) and equals 0 otherwise, then r is an unbiased estimator of the Jaccard similarity coefficient J(A, B). Since r is always equal to the value of 0 or 1, r has too high a variance to be a useful estimator for the Jaccard similarity coefficient on its own, the MinHash technique reduces this variance by averaging together several variables constructed in the same way.

The simplest version of the MinHash technique uses k different hash functions, where k is a fixed integer parameter, and represents each set S by the k values of hmin(S) for these k functions. In this version of the MinHash technique, y is the number of hash functions for which hmin(A)=hmin(B), k is the number of hash functions and y same hash values divided by k hash functions is the estimate of Jaccard similarity coefficient J(A, B). This estimate is the average of k different random variables from 0 to 1, each of which equals 1 when hmin(A) hmin(B) and equals 0 otherwise, and each of which is an unbiased estimator of the Jaccard similarity coefficient J(A, B).

Therefore, the average of the k different random variables is also an unbiased estimator, converges to a normal distribution, and by standard deviation for sums of random variables from 0 to 1, the expected error is $O(1/\sqrt{k})$. Therefore, for any constant $\varepsilon>0$ there is a constant $k=O(1/\varepsilon^2)$ such that the expected error of the estimate is at most $\varepsilon$. For example, 400 hashes would be required to estimate the Jaccard similarity coefficient J(A, B) with an expected error which is less than or equal to 0.05.

Given files A and B, the Jaccard similarity coefficient is defined as:

$$J(A, B) = |A \cap B|/|A \cup B|$$

Therefore, the size of the union of two files A and B with MinHash values $M_1$ and $M_2$ may be estimated using the formula:

$$J(A, B) = (|A| + |B| - |A \cup B|)/|A \cup B|$$

$$J(A, B) * |A \cup B| = (|A| + |B| - |A \cup B|)$$

$$|A \cup B| + [J(A, B) * |A \cup B|] = |A| + |B|$$

$$|A \cup B| * [1 + J(A, B)] = |A| + |B|$$

$$|A \cup B| = (|A| + |B|)/[1 + J(A, B)]$$

where J(A, B) is the Jaccard similarity coefficient estimated using the MinHash values:

J(A,B)=(number of common MinHash values)/(total number of MinHash values).

Since |A| and |B| are known, the above formulas can be used to estimate the size of the union of the two files A and B. Additionally, the MinHash values of A and B can be combined to form the MinHash technique's representation of |A∪B|. If m is the number of MinHash values in $M_A$ and MB, then $M_{A \cup B}$=minimum hashes of $M_A \cup M_B$.

Therefore, the number of MinHash values for a first file which are equal to their corresponding MinHash values for a second file divided by the total number of MinHash values [y{hmin(A)=hmin(B)}/k] is used as an estimate of the Jaccard similarity coefficient for the two data files. The aggregated number of total fingerprints for the two data files (|A|+|B|) is divided by the sum of one plus the estimate of the Jaccard similarity coefficient (1+J(A, B)) to estimate the number of unique data segments for the union of the two data files. The estimated number of unique data segments is then multiplied by the average size of the data segments to estimate the size of the union of the two data files.

For example, if 100 of 100 MinHash values generated for the 400 fingerprints for file A are the same as their corresponding 100 MinHash values generated for the 400 fingerprints for file B, then the estimate of the Jaccard similarity coefficient for combined files A and B equals the 100 common MinHash values divided by the 100 MinHash functions, which equals 1.0. The aggregated numbers of unique fingerprints for files A and B equals 400 total fingerprints for file A added to the 400 total fingerprints for file B which equals 800 unique fingerprints. The 800 total fingerprints are divided by the sum of 1.0 plus the estimate of the Jaccard similarity coefficient of 1.0, such that 800 divided by (1.0+1.0) equals 800 divided by 2.0, which equals an estimated 400 unique data segments for the union of files A and B. The estimate of 400 unique data segments is then multiplied by the average size of 10 KB per data segment to estimate a size of 4 MB for the union of files A and B.

In another example, if 0 of the 100 MinHash values generated for the 400 fingerprints for file A are the same as their corresponding 100 MinHash values generated for the 400 fingerprints for file B, then the estimate of the Jaccard similarity coefficient for combined files A and B equals 0 common MinHash values divided by 100 MinHash functions, which equals 0.0. The aggregated numbers of fingerprints for files A and B equals 400 total fingerprints for file A added to 400 total fingerprints for file B which equals 800 total fingerprints. The 800 total fingerprints are divided by the sum of 1.0 plus the estimate of the Jaccard similarity coefficient of 0.0, such that 800 divided by (1.0+0.0) equals 800 divided by 1.0, which equals an estimated 800 unique data segments for the union of files A and B. The estimate of 800 unique data segments is then multiplied by the average size of 10 KB per data segment to estimate a size of 8 MB for the union of files A and B.

Embodiments herein enable estimating data file union sizes. A system identifies a first file's first minimum value from a hash value generated by applying a first hash function to the first file's first segment identifier and a hash value generated by applying the first hash function to the first file's second segment identifier. The system identifies the first file's second minimum value from a hash value generated by applying a second hash function to the first file's first segment identifier and a hash value generated by applying the second hash function to the first file's second segment identifier. The system identifies a second file's first minimum value from at least a hash value generated by applying the first hash function to the second file's first segment identifier and a hash value generated by applying the first hash function to the second file's second segment identifier. The system identifies the second file's second minimum value from at least a hash value generated by applying the second hash function to the second file's first segment identifier and a hash value generated by applying the second hash function to the second file's second segment identifier. The system estimates a size of a union of the first and second files based on whether the first file's first minimum value equals the second file's first minimum value, whether the first file's second minimum value equals the second file's second minimum value, the first file's size, and the second file's size.

For example, an estimator tool identifies hash function 1's final minimum value of 91 as the MinHash value of hash function 1 for file A, after applying hash function 1 to generate hash function 1's hash values for all of file A's 400 fingerprints, which includes applying hash function 1 to file A's fingerprint 1 to generate the hash value of 17,445 and applying hash function 1 to file A's fingerprint 2 to generate the hash value of 91. The estimator tool identifies hash function 2's final minimum value of 139 as the MinHash value of hash function 2 for file A, after applying hash function 2 to generate hash function 2's hash values for all of file A's 400 fingerprints, which includes applying hash function 2 to file A's fingerprint 1 to generate the hash value of 25,871 and applying hash function 2 to file A's fingerprint 2 to generate the hash value of 58,168. The estimator tool identifies hash function 1's final minimum value of 91 as the MinHash value of hash function 1 for file B, after applying hash function 1 to generate hash function 1's hash values for all of file B's 400 fingerprints, which includes applying hash function 1 to file B's fingerprint 1 to generate the hash value of 38,490 and applying hash function 1 to file A's fingerprint 2 to generate the hash value of 25,654. The estimator tool identifies hash function 2's final minimum value of 123 as the MinHash value of hash function 2 for file B, after applying hash function 2 to generate hash function 2's hash values for all of file B's 400 fingerprints, which includes applying hash function 2 to file B's fingerprint 1 to generate the hash value of 62,927 and applying hash function 2 to file B's fingerprint 2 to generate the hash value of 25,628.

Then the estimator tool determines that 60 of the 100 MinHash values generated for the 400 fingerprints for file A are the same as their corresponding 60 of the 100 MinHash values generated for the 400 fingerprints for file B, then estimating the Jaccard similarity coefficient as equal to 60 common MinHash values divided by 100 total MinHash functions which equals 0.6. The estimator tool determines that the aggregated numbers of fingerprints for files A and B is equal to 400 total fingerprints for file A plus 400 total fingerprints for file B, which equals 800 total fingerprints, which represent 800 data segments. The estimator tool adds the 4 MB size of file A to the 4 MB size of file B to total a maximum 8 MB size for the union of files A and B, and divides this 8 MB size by the 800 data segments to identify an average segment size of 10 KB. The estimator tool divides the 800 total fingerprints by the sum of 1.0 plus the estimate of the Jaccard similarity coefficient of 0.6, which is 800 divided by (1.0+0.6), or 800 divided by 1.6, which equals an estimated 500 unique data segments for the union of files A and B. The estimator tool multiplies the estimate of 500 unique data segments by the average size of 10 KB per data segment to estimate a size of 5 MB for the union of files A and B.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of server or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing fingerprint information associated with each block and mapping the identical blocks to a single copy of the data. In such systems, an index table of unique fingerprints is created to find commonality among the data set.

Data deduplication can operate at a file or a data block level, where a data block is a chunk or subset of a file. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a fingerprint (e.g., SHA, checksum) and, a deduplication key for each data block. When two data blocks have the same fingerprint they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing fingerprints for data blocks. A fingerprint (also referred to as a digest or hash) is a representation of contents stored in a data block. Further, the fingerprint is mathematically computed (e.g., MD5, SHA-1, SHA-2) in such a way that, computationally, there is a very low or zero probability of finding two data blocks that have the same fingerprint but different contents. If the fingerprint for the data block is sent together with the data block, a recipient of the data block can compute a new fingerprint from the received data block and can compare the new fingerprint with the received fingerprint to determine whether the received data block is valid. Additionally, a fingerprint is stored in an index table in order to process data blocks within the data set for deduplication. Further, a deduplication key identifying a data block is also stored in index table along with the fingerprint for the data block.

A deduplication key uniquely identifies a data block by storing information (such as logical address, physical address) of the data block. Deduplication logic 107 identifies data blocks that can potentially be deduplicated by comparing fingerprints of data blocks with list of fingerprints stored in the index table. Further, when data blocks are deduplicated after comparing fingerprint information, deduplication logic 107 updates metadata of deduplicated data blocks. Additionally, deduplication logic 107 updates metadata of a data block when the data block is altered.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Figure 2:
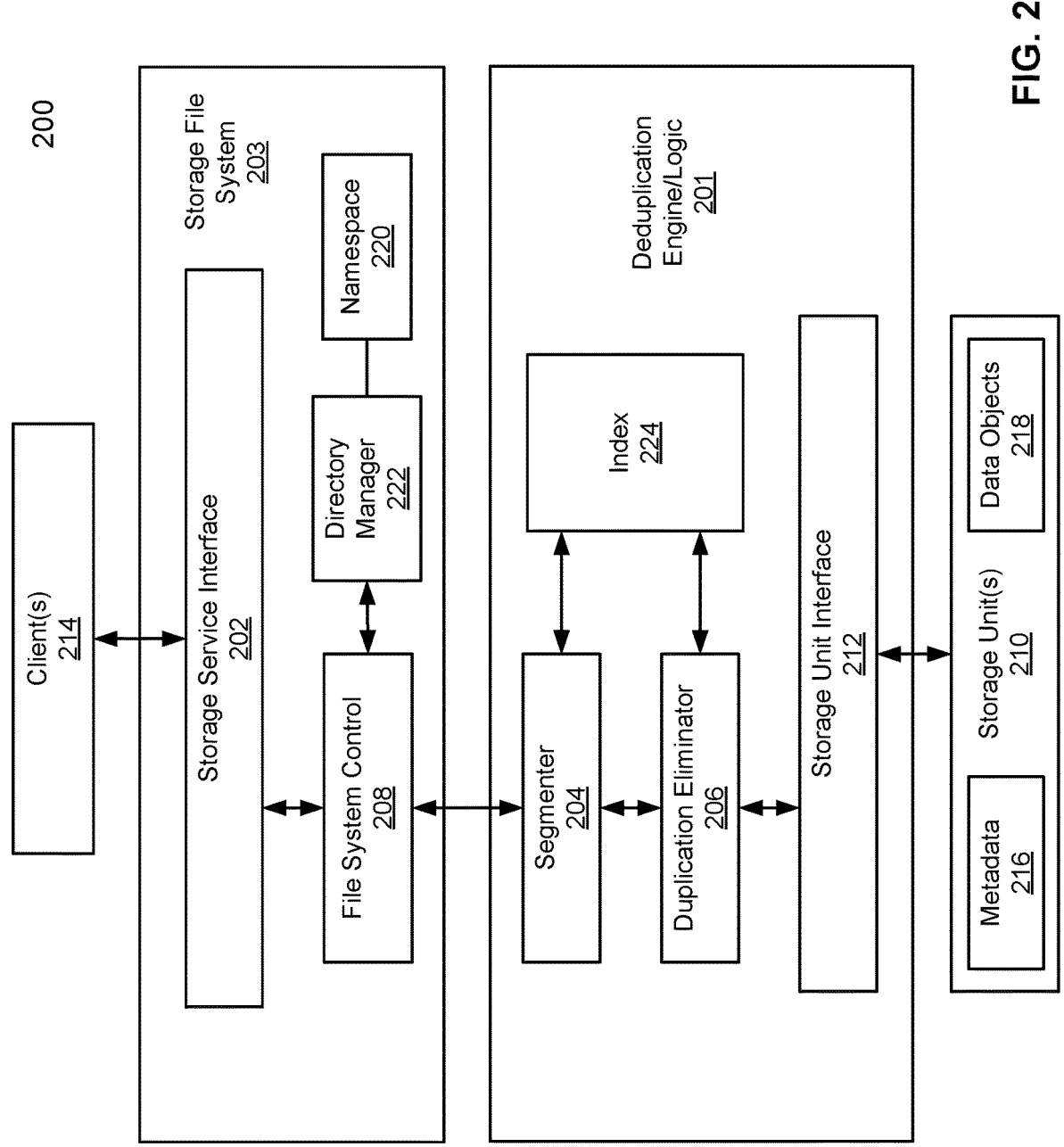
FIG. 2 is a block diagram illustrating a deduplicated storage system according to one embodiment of the invention.

FIG. 2 is a block diagram illustrating a deduplication storage system according to one embodiment of the invention. For example, deduplication storage system 200 may be implemented as part of a deduplication storage system as described above, such as, for example, the deduplication storage system as a client and/or a server described above. In one embodiment, storage system 200 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 200 may have a distributed architecture, or all of its components may be integrated into a single unit. Storage system 200 may be implemented as part of an archive and/or backup system, or a disaster recovery system, such as a deduplicating storage system available from EMC® Corporation of Hopkinton, Massachusetts.

In one embodiment, storage system 200 includes deduplication logic 201 interfacing one or more clients 214, via file system 203, with one or more storage units 210 storing metadata 216 and data objects 218. Clients 214 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while the another one of storage units 210 operates as a target storage unit to periodically archive data from the active storage unit according to an archiving policy or scheme.

Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints, or representatives contained within data objects 218, where a data object may represent a data segment (also referred to as a data chunk), a compression region (CR) of one or more data segments, or a container of one or more CRs. Fingerprints are mapped to a particular data object via metadata 216, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the segments associated with the file name are stored, reconstruction information for the file using the segments, and any other appropriate metadata information. Metadata 216 may further include a segment ID, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID (e.g., a set of values characterizing the segment) do not need to be recomputed for the evaluation of a given incoming data segment. In one embodiment, a segment ID includes one or more deterministic functions of a data segment (also referred to as a data segment), one or more hash functions of a data segment, random data, or any other appropriate data segment ID.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 203 includes file service interface 202, file system control logic 208, directory manager 222, and namespace 220. Deduplication logic 201 includes segmenter 204 (also referred to as a segmenting module or unit), duplicate eliminator 206, and storage unit interface 212. File system control 208 receives a file or files (or data item(s)) via file service interface 202, which may be part of a file system namespace 220 of file system 203 associated with the deduplication logic 201. The file system namespace 220 refers to the way files are identified and organized in the system. An example is to organize the files hierarchically into directories or folders, which may be managed by directory manager 222. File service interface 212 supports a variety of protocols, including a network file system (NF S), a common Internet file system (CIFS), a direct access file system (DAFS), Hadoop distributed file system (HDFS), and a virtual tape library interface (VTL), etc.

The file(s) is/are processed by segmenter 204 and file system control 208. Segmenter 204, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-170 (RACE Integrity Primitives Evaluation Message Digest 170-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 208, also referred to as a file system manager, processes information to indicate the segment(s) association with a file. In some embodiments, a list of fingerprints is used to indicate segment(s) associated with a file. File system control 208 passes segment association information (e.g., representative data such as a fingerprint) to index 224. Index 224 is used to locate stored segments in storage units 210 via storage unit interface 212. In one embodiment, index 224 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 224 maps a fingerprint of a segment to a container identifier identifying a container that contains the corresponding segment.

In one embodiment, index 224 includes a persistent hash-table of segment-IDs keyed either by the fingerprint of the data stored in the segment or by the deduplication key of the data stored in the segment. The index 224 need not contain entries for every data segment in the deduplication domain, but the effectiveness of deduplication is a function of the number of entries stored in the index 224. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 224) that maintains a fingerprint (e.g., SHA, checksum) and a deduplication key for each data block. When two data blocks have the same fingerprint they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplicate eliminator 206, also referred to as a segment store, identifies whether a newly received segment has already been stored in storage units 210. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 210 that make up the file. Segments are then packed by a container manager (which may be implemented as part of storage unit interface 212) into one or more storage containers stored in storage units 210. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 202 is configured to communicate with file system control 208 to identify appropriate segments stored in storage units 210 via storage unit interface 212. Storage unit interface 212 may be implemented as part of a container manager. File system control 208 communicates (e.g., via segmenter 204) with index 224 to locate appropriate segments stored in storage units via storage unit interface 212. Appropriate segments are retrieved from the associated containers via the container manager and are used to construct the requested file. The file is provided via interface 202 in response to the request. In one embodiment, file system control 208 utilizes a tree (e.g., a segment tree obtained from namespace 220) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 201) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 3A:
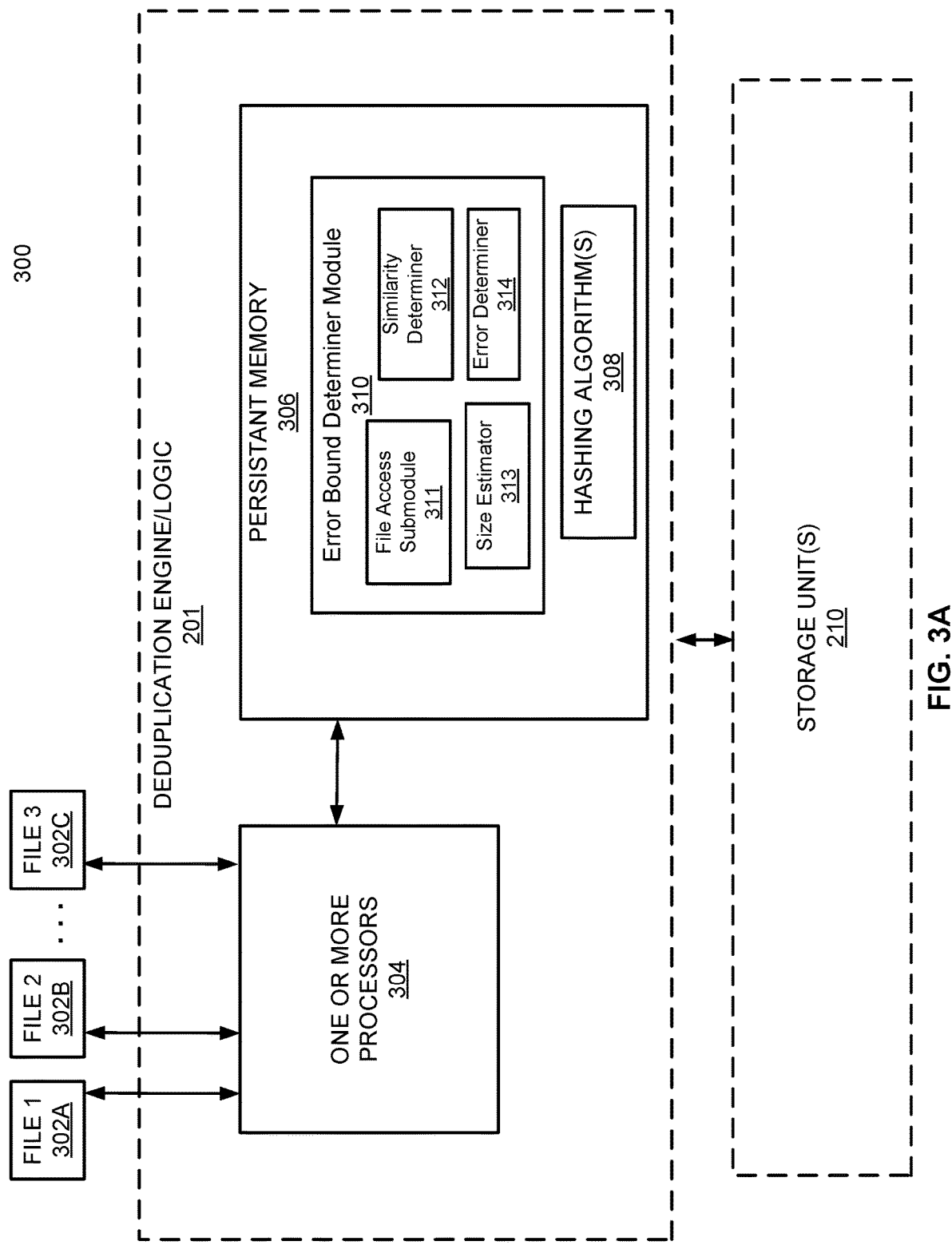
FIG. 3A is a block diagram of a system for deduplicating at least two files according to one embodiment of the invention.

FIG. 3A is a block diagram of a system 300 for deduplicating at least two files. The system determines the maximum error, or error bounds, when calculating the size of two or more files (being deduplicated) using MinHash in a deduplication file system. The system 300 includes the deduplication engine/logic 201 illustrated in FIG. 2 above and the storage unit(s) 210, also described in FIG. 2. Additionally, the deduplication system includes, as part of the deduplication engine/logic, one or more processors 304 and a persistent memory 306. The persistent memory is a non-transitory computer readable medium that includes executable instructions, such as error bound determiner module 310, stored thereon, that when executed by the one or more processors, causes the one or more processors to perform various operations, including those described herein. The persistent memory can comprise, for example, a hard drive, random access memory (RAM), read-only memory (ROM), or any other suitable persistent memory device.

In some embodiments, the one or more processors 304 are to access, using the file access submodule 311, two or more files, such as files 302A-302C. The files each contain various data, some, all, or none of which may be duplicated or common between the files. That is, some, none, or all of the data in the first file may be the same as data in the second file, and so forth.

Figure 3B:
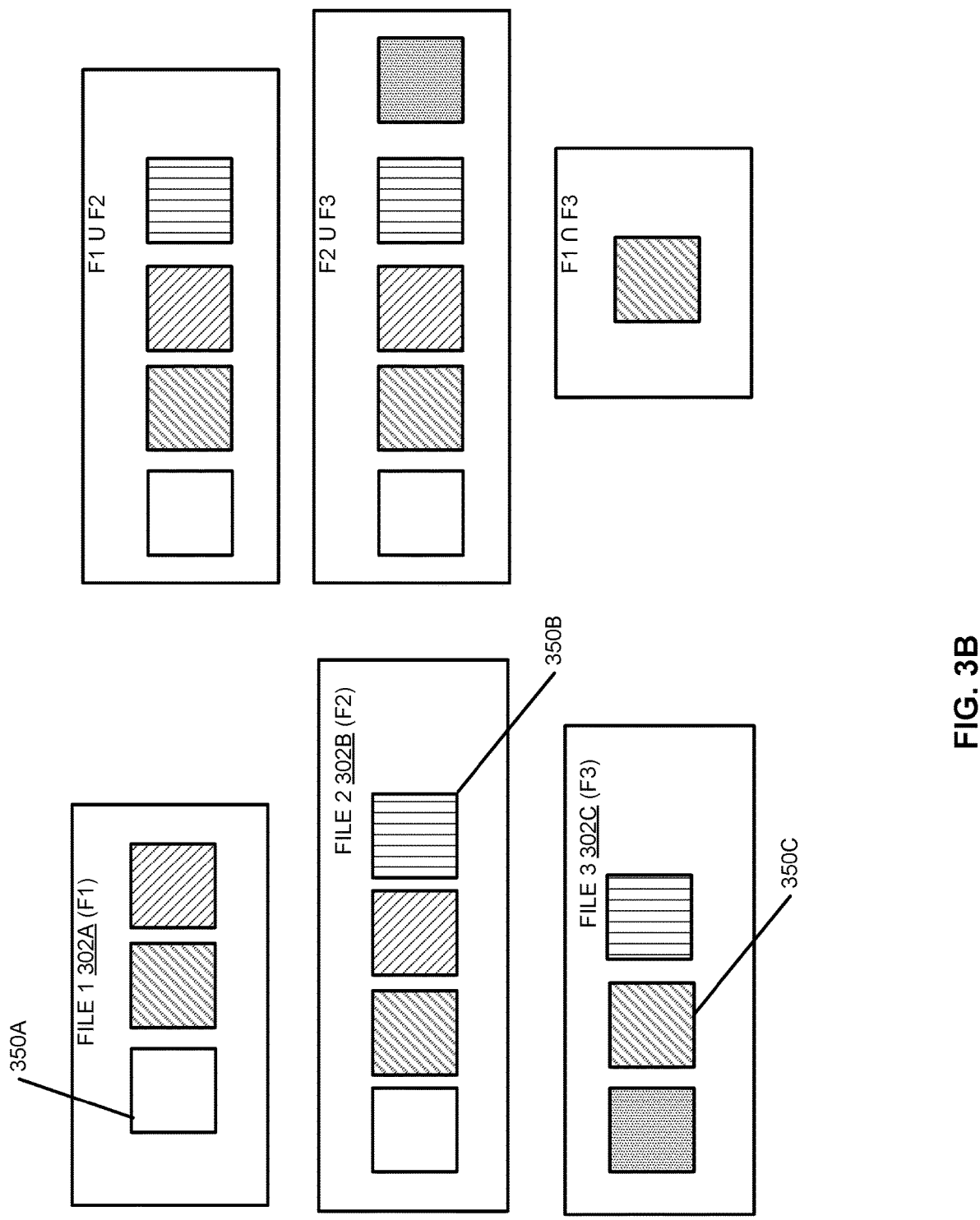
FIG. 3B is a diagram of example files according to one embodiments of the invention.

FIG. 3B is a diagram of an example File 1 302A, File 2 302B, and File 3 302C from FIG. 3A. Each file contains one or more data segments, such as data segment 350A in File 1, data segment 350B in File 2, and data segment 350C in File 3. Each of the data segments represent data chunks, or portions, of their respective files. FIG. 3B also depicts various unions and intersections of File 1 (F1), File 2 (F2), and File 3 (F3). For example, F1 U F2 is depicted, and includes each of the data segments that are in at least one of F1 and F2. Similarly, F2 U F3 is depicted, and includes each of the data segments that are in at least one of F2 and F3. F1∩F3 is also depicted, which is the intersection of F1 and F3, and includes only the data segment(s), such as data segment 350C, that is/are common between F1 and F3.

As shown in FIG. 3B, F1 includes data segment 350A, which is also found in F2. That is, data segment 350A is one of the data segments mentioned above that are representative of the first and second files. Similarly, data segment 350C, which is also found in F1, is one of the data segments mentioned below that are representative of the first and third files.

Referring back to FIG. 3A, first, to determine the maximum error of the size estimation of the deduplicated files, F1 and F2, the system 300 determines the intersection of the two files. This is represented by Equation 1 below.

$$|F1 \cap F2| = J(F1, F2) * |F1 U F2| \qquad \text{Equation 1}$$

Where J(F1, F2) is the Jaccard similarity index of F1 and F2. The Jaccard similarity index is a statistic used for gauging the similarity or diversity of one or more sample sets. The Jaccard similarity index of two files, F1 and F2, is a number greater than or equal to zero and less than or equal to one, and is defined as J(F1, F2)=|F1∩F2|/|F1 U F2| using Equation 1 above.

The Jaccard similarity index of F1 and F2 is defined as the size of the intersection of the two files divided by the size of the union of the two files. The typical method of updating the Jaccard similarity index includes iterating every fingerprint (e.g., each fingerprint is a 24 Byte representation of a data segment or data chunk of a file, each data segment or chunk typically being 8 KB in size) of F1 and every fingerprint of F2 and identifying the common fingerprints between the two files. This is computationally complex. For example, for a 1 TB file divided into 8 KB data segments, where each 8 KB data segment is represented by a "fingerprint", there would be about 131 million fingerprints. Every one of those fingerprints would need to be iterated. Methods for determining the Jaccard similarity index, other than finding the union and intersection of the two file segments (very memory and computational intensive), are described further hereinbelow.

|F1 U F2| is the size of the union of F1 and F2, which is calculated using Equation 2 below. |F1 U F2| is the size of the file segments being deduplicated after deduplication.

$$|F1 U F2| = |F1| + |F2| - |F1 \cap F2| \qquad \text{Equation 2}$$

The size of the union of F1 and F2 is equal to the summation of the sizes of F1 and F2 subtracted by the size of the intersection of F1 and F2, determined using Equation 1 above. Substituting the variables above, the size of the union of F1 and F2 can be determined using Equation 3 below.

$$|F1 \cup F2| + J(F1, F2) * |F1 \cup F2| = |F1| + |F2| \quad \text{Equation 3}$$
$$|F1 \cup F2| * (1 + J(F1, F2)) = |F1| + |F2|$$
$$|F1 \cup F2| = (|F1| + |F2|)/(1 + J(F1, F2))$$

Equation 3 above determines the size of the union of two data segments, such as F1 and F2. This determines what the size of the F1 and F2 will be when they are deduplicated. This is important, as stated above, for determining how much space will be taken up by files in storage. The size of the union of F1 an F2 is equal to the sum of the size of F1 and the size of F2, divided by the sum of one plus the Jaccard similarity index of F1 and F2. The Jaccard similarity score is also referred to as a similarity score below. F1 and F2 in the above equations are also referred to as first file 302A and second file 302B below. F3, when discussed below will be referred to as third file 302C.

In some embodiments, the one or more processors are further to determine, using similarity determiner 312 and as discussed above, a similarity, denoted by a similarity score, between two or more of files 302A-302C. The similarity score can be determined using the formula from Equation 1 above, $J(F1, F2)=|F1 \cap F2|/|F1 \cup F2|$. However, as stated above, this is very computationally complex and memory intensive. Another option that is less computationally complex and less memory intensive is to calculate the similarity score (Jaccard similarity index) using MinHashes as described below.

To determine the similarity score between the first file 302A and the second file 302B, the one or more processors 304 are further to apply a hashing algorithm 308 (e.g., stored in the persistent memory and executable by the one or more processors) to the first file and the second file to obtain a first MinHash value representing the first file and a second MinHash value representing the second file. The one or more processors are further to determine a Jaccard similarity index of the first and second files based on the first MinHash value and the second MinHash value, wherein the similarity score corresponds to the Jaccard similarity index. MinHash (or the min-wise independent permutations locality sensitive hashing scheme) refers to a technique for estimating how similar two sets are.

As stated above, the Jaccard similarity index can be calculated using MinHash representations of the two files F1 and F2. In comparison to explicitly computing the intersection and union of files for each of the 131 million fingerprints in the Example above, using MinHashes to estimate the Jaccard similarity index reduces the computational complexity and memory overheads substantially. In some embodiments, for applying the hashing algorithm as discussed herein, a hash function h is chosen and it is applied for all set of fingerprints for a file F1 and then the minimum value of the hash function output is selected. Similarly, the system 300 repeats the application for "k" hash functions. To convert the fingerprints (e.g., 131 million fingerprints in the above example) into "k" MinHash signatures, initially, a MinHash array M is provided with k values, each of the k values is set to 0. There are two independent has functions $h_1$ and $h_2$. Next, every fingerprint is iterated and for each fingerprint an iteration for k times the MinHash signature $\text{Signature}_n = h(n)$ is calculated, where $0 \leq i < k$, $1 \leq n \leq k$. After each fingerprint integration, the k signatures are obtained. If $\text{Signature}_n$ is larger than M(n), the value at M(n) is replaced with $\text{Signature}_n$. The MinHash array M is updated in each fingerprint iteration, and thereby the file can be represented by a fixed set of k values.

The "k" values can be any positive integer (e.g., k=128, 512, 1024, 4096, etc.). The similarity estimation follows a Bernoulli distribution and the standard error, which is $1/\sqrt{k}$ depends directly on the value of "k". The standard error of similarity is $\sigma \leq 0.0078$ when k=4096, and $\sigma \leq 0.0156$ when k=1024. Moreover, the performance impact is minor as "k" increases. MinHash clustering with k=1024 works well in many embodiments. The result is that a file can be represented by a fixed set of k values instead of a large number of fingerprints (e.g., data chunks). The k MinHashes are generated by "k" independent, uniform random hash functions.

At every iteration, the system 300 combines MinHashes of the deduplicating files (C) and updates the sizes, since there is an error in estimating similarity, there is an error in estimating file union sizes that gets accumulated in every iteration.

For example:
Iteration 1: |C1 U C2|
Iteration 2: ||C1 U C2| U C3|
Iteration 3: |||C1 U C2| U C3| U C4|
. . .
Iteration N−1: |||C1 U C2| U C3| U C4| . . . U Cn|

To determine the Jaccard index between two files F1 and F2 from their MinHash values the well-known property of MinHash that the Jaccard similarity index of two sets is equal to $\Pr[h_{min}(F1)=h_{min}(F2)]$ is used if there are no hash collisions. That is, the probability that $h_{min}(F1)=h_{min}(F2)$ is true is equal to the similarity J(A,B), as shown in Equation 4:

$$Pr(h_{min}(F1) = h_{min}(F2)) = |F1 \cap F2|/|F1 \cup F2| = J(F1, F2) \quad \text{Equation 4}$$

As stated above, performing the similarity calculations (e.g., Equation 4) using MinHashes follows a binomial distribution with an error represented by F (determining this error is described further below). The Jaccard similarity index calculation using MinHashes can therefore be represented by the below formula:

$$J(F1, F2) \text{ using MinHashes} = J(\widehat{F1, F2}) + \varepsilon, \quad \text{Equation 5}$$

Where $J(\widehat{F1,F2})$ is the estimated similarity using MinHashes and $\varepsilon$ is the error in that similarity. Given that there is error in determining similarity, there is an error in size estimation of the deduplicated files as well if $J(\widehat{F1,F2})$ is used to estimate the size of the deduplicated files. If two file sets F1 and F2 are represented by k MinHash functions, then the similarity estimate follows a binomial distribution with similarity=$\propto$, variance $(\varepsilon)=\propto(1-\propto)/k$, and standard deviation=$\sigma=\sqrt{\propto(1-\propto)/k}$. Standard deviation is maximized when $\propto=\frac{1}{2}$, i.e., $\sigma \leq \frac{1}{2}\sqrt{k}$. Furthermore, if k=1024, $\sigma \leq 0.0156$.

In some embodiments, the one or more processors 304 are further to determine, using size estimator 313, a size estimation of a combination of the first file 302A and the second file 302B based on the similarity score. To determine the size estimation of the first and second files, in some embodiments, the one or more processors 304 are further to determine a size of the first file 302A and a size of the second file 302B and calculate a first summation of the size of the first file and the size of the second file. The one or more processors are further to calculate a second summation of one and the Jaccard similarity index and divide the first summation by the second summation to thereby obtain the estimation of the size of the first and second files. This is illustrated by Equation 3 above.

As described above, in some cases, it may be desired to apply multiple hashing algorithms to each file to obtain multiple MinHash values for each file. As such, in some embodiments, the one or more processors 304 are further to apply one or more second hashing algorithms 308 to the first file 302A and the second file 302B to generate a plurality of additional MinHash values, wherein a first subset of the plurality of additional MinHash values represents the first file and a second subset of the plurality of additional MinHash values represents the second file. In some embodiments, the one or more processors are further to determine the Jaccard similarity index of the first and second files based on the first MinHash value, the second MinHash value, and the plurality of additional MinHash values. The system 300 may then choose from among the MinHash values for each respective file to use to determine the Jaccard similarity index. For example, the one or more processors may choose the MinHash values of the first file and the second file that are the lowest MinHash values for each file.

As described above, applying the hash function(s) (i.e., using MinHash) to determine the similarity score has its own inherent error and this error is passed on to the determination of the Jaccard similarity index, and thereby the size estimation of the deduplicated file segments also has an error associated therewith. This error is shown in Equation 6 below.

$$|\widehat{F1 \cup F2}| = (|F1| + |F2|)/(1 + J(F1, F2) + \varepsilon)$$ Equation 6

Where $|\widehat{F1 \cup F2}|$ is the estimated size of the union of F1 and F2 and $\varepsilon$ is the error associated with determining the Jaccard similarity index using MinHash as defined above in Equation 5.

Adding a third file F3 provides: |F1 U F2 U F3|=(F1 U F2) U F3. The estimate is |F1 U F2 U F3|=($|\widehat{F1 \cup F2}|$+t2) U F3. Substituting (F1 U F2) by F2' provides |F2' U F3|=|$\widehat{F2' \cup F3}$|+t3.

Thus, F2' has error term t2 and F3 introduces the additional error term t3. In this way, the error accumulates as the set of files increase. Since the error accumulates, there is a need to determine an upper bound in the accumulated error as the number of files being "unioned" increases. The maximum error (i.e., an upper bound in the accumulated error) for the size estimation of the first and second files 302A and 302B is defined by Equation 7 below. Var(t) is the variance in size estimation of the deduplicated first and second files (or file) at the "nth" node in a hierarchical clustering solution. It is less than or equal to the sum of the square of the product of the actual size of first and second files and the standard deviation taken over all the child nodes under the "nth" node. Var(t) is used to determine the maximum error for the size estimation of the combination of the first and second files at clustering iteration n (each clustering iteration is a new iteration of deduplicating or clustering two or more files):

$$\text{Var}(t_n) \leq \sum_{i=1}^{n} S_i^2 \cdot \sigma_i^2$$ Equation 7 where the summation is taken over all the child nodes under the nth node. This is true for every integer n≥1. Here, if two Files A and B are represented by k MinHash functions, then the similarity estimate between the two files, first file 302A and second file 302B, follows a binomial distribution with similarity (derived from the Jaccard similarity index/score)=∝. Then $$\text{variance} = \frac{\propto (1 - \propto)}{k} \text{ and standard deviation} = \sigma = \sqrt{\frac{\propto (1 - \propto)}{k}}.$$

This is true because Pr $[h_{min}(A)==h_{min}(B)]$ is equal to ∝. Furthermore, standard deviation is $$\sigma \leq \frac{1}{2\sqrt{k}}$$

attains its maximum at $$\propto = \frac{1}{2}$$

for $\propto \in [0,1]$. Particularly, if k=1024, then σ=0.0156, And when ∝ is close to 1 or 0, and σ is much smaller than 0.0156. The maximum error for the size estimation is unbiased. σ in Equation 7 can be set to a predetermined value. For example, if k=1024, σ≤0.0156. The maximum σ in Equation 7 can be set to a predetermined value when k is determined $$\sigma \leq \frac{1}{2\sqrt{k}}.$$

Some of the variables used herein, including in Equation 7, are defined as follows:
$S_n$=actual size of the cluster of files at iteration n
$\widehat{S_n}$ =estimated size of the cluster at iteration n
$t_n = \widehat{S_n} - S_n$, the error in $\widehat{S_n}$
$\propto_n$=actual similarity at iteration n
$\widehat{\propto_n}$ =estimated similarity at iteration n
$\varepsilon_n = \widehat{\propto_n} - \propto_n$, the error in $\widehat{\propto_n}$
$\sigma_n^2 = \text{Var}(\varepsilon_n)$
$E[t_n]$=expected error in $\widehat{S_n}$
Theorem 1: Given an ε<<1 and any constant β≥0, then $$\frac{1}{\beta + \varepsilon} \approx \frac{1}{\beta} - \frac{\varepsilon}{\beta^2}$$

Theorem 2:
Suppose cluster n+1 has two independent child clusters n and n−1. Given the estimated size of the cluster n+1 is equal to the sum of estimated size of the cluster n and estimated size of the cluster n−1 divide by 1+estimated similarity at iteration n+1, we have the estimated size for cluster n+1 to be:

$$\widetilde{S_{n+1}} = \frac{\widetilde{S_n} + \widetilde{S_{n-1}}}{1 + \widetilde{\alpha_{n+1}}} = \frac{S_n + c_n + S_{n-1} + c_{n-1}}{1 + \alpha_{n+1} + \varepsilon_{n+1}}$$

Applying Theorem 1 on $$\frac{1}{(1 + \alpha_{n+1} + \varepsilon_{n+1})} = \frac{S_n + t_n + S_{n-1} + t_{n-1}}{1 + \alpha_{n+1}} \cdot \left(1 - \frac{\varepsilon_{n+1}}{1 + \alpha_{n+1}}\right) =$$

$$\frac{S_n + S_{n-1}}{1 + \alpha_{n+1}} + \left(\frac{S_n + S_{n-1}}{1 + \alpha_{n+1}}\right) \cdot \left(\frac{-\varepsilon_{n+1}}{1 + \alpha_{n+1}}\right) + \left(\frac{t_n + t_{n-1}}{1 + \alpha_{n+1}}\right) \cdot \left(1 - \frac{\varepsilon_{n+1}}{1 + \alpha_{n+1}}\right)$$

Substituting $$\frac{S_n + S_{n-1}}{1 + \alpha_{n+1}} \text{ by } S_{n+1} = S_{n+1} + S_{n+1} \cdot \left(\frac{-\varepsilon_{n+1}}{1 + \alpha_{n+1}}\right) + \left(\frac{t_n + t_{n-1}}{1 + \alpha_{n+1}}\right) \cdot \left(1 - \frac{\varepsilon_{n+1}}{1 + \alpha_{n+1}}\right)$$

Dropping $$\left(1 - \frac{\varepsilon_{n+1}}{1 + \alpha_{n+1}}\right) \text{ as } \alpha \in [1, 0] \text{ and } \varepsilon << 1, \frac{\varepsilon_{n+1}}{1 + \alpha_{n+1}} \approx 0$$

$$\approx S_{n+1} + S_{n+1} \cdot \left(\frac{-\varepsilon_{n+1}}{1 + \alpha_{n+1}}\right) + \left(\frac{t_n + t_{n-1}}{1 + \alpha_{n+1}}\right)$$

Moving $S_{n+1}$ to the left of the equation provides:

$$\widetilde{S_{n+1}} - S_{n+1} \approx S_{n+1} \cdot \left(\frac{-\varepsilon_{n+1}}{1 + \alpha_{n+1}}\right) + \left(\frac{t_n + t_{n-1}}{1 + \alpha_{n+1}}\right)$$

$$t_{n+1} \approx S_{n+1} \cdot \left(\frac{-\varepsilon_{n+1}}{1 + \alpha_{n+1}}\right) + \left(\frac{t_n + t_{n-1}}{1 + \alpha_{n+1}}\right)$$

Applying Var( ) on both sides of the equation provides:

$$\mathrm{Var}(t_{n+1}) \approx \mathrm{Var}\left(S_{n+1} \cdot \left(\frac{-\varepsilon_{n+1}}{1 + \alpha_{n+1}}\right) + \left(\frac{t_n + t_{n-1}}{1 + \alpha_{n+1}}\right)\right)$$

Since $\varepsilon$ and t are independent and random variables, therefore $$\approx \mathrm{Var}\left(S_{n+1} \cdot \left(\frac{-\varepsilon_{n+1}}{1 + \alpha_{n+1}}\right)\right) + \mathrm{Var}\left(\frac{t_n}{1 + \alpha_{n+1}}\right) + \mathrm{Var}\left(\frac{t_{n-1}}{1 + \alpha_{n+1}}\right)$$

Dropping $$\frac{1}{1 + \alpha_{n+1}}$$

for an upper bound:

$$\mathrm{Var}(t_{n+1}) \leq \mathrm{Var}(S_{n+1} \cdot (-\varepsilon_{n+1})) + \mathrm{Var}(t_n) + \mathrm{Var}(t_{n-1})$$

$$\leq S_{n+1}^2 \mathrm{Var}(\varepsilon_{n+1}) + \mathrm{Var}(t_n) + \mathrm{Var}(t_{n-1})$$

Substituting $\mathrm{Var}(\varepsilon_{n+1})$ by $\sigma_{n+1}^2$:

$$\leq S_{n+1}^2 \cdot \sigma_{n+1}^2 + \mathrm{Var}(t_n) + \mathrm{Var}(t_{n-1})$$

Applying the induction assumption provides:

$$\leq S_{n+1}^2 \cdot \sigma_{n+1}^2 + \sum_{i=1}^{n} S_i^2 \cdot \sigma_i^2 + \sum_{i=1}^{n-1} S_i^2 \cdot \sigma_i^2$$

As n and n−1 are two independent sub-clusters of n+1. Combining their summations and $S_{n+1}^2 \cdot \sigma_{n+1}^2$ provides:

$$\mathrm{Var}(t_{n+1}) \leq \sum_{i=1}^{n+1} S_i^2 \cdot \sigma_i^2$$

describing the upper bound in the accumulated errors for the size estimation of the first and second files.

Theorem 3: The cluster size estimate accumulated over iterations is unbiased. Therefore, the expected value E of the size of the error at clustering iteration n≈0.

$$E[t_n] \approx 0$$

This is true for every integer n≥1.

Proof. For the base case n=3:

$$t_3 \approx S_3 * \left(\frac{-\varepsilon_3}{1 + \alpha_3}\right)$$

Applying E[ ] to both sides:

$$E[t_3] \approx E\left[S_3 * \left(\frac{-\varepsilon_3}{1 + \alpha_3}\right)\right]$$

Since $S_3$ and $\alpha_3$ are constant $$\approx S_3 * \left(\frac{E[-\varepsilon_3]}{1 + \alpha_3}\right)$$

$E[\varepsilon_3]=0$, therefore $E[t_3] \approx 0$. From induction, assume $E[t_n] \approx 0$ is true, then to prove $E[t_{n+1}] \approx 0$ is also true.

$$t_{n+1} \approx S_{n+1} * \left(\frac{-\varepsilon_{n+1}}{1 + \alpha_{n+1}}\right) + \left(\frac{t_n + t_{n-1}}{1 + \alpha_{n+1}}\right)$$

Applying E[ ] on both sides $$E[t_{n+1}] \approx E\left[S_{n+1} * \left(\frac{-\varepsilon_{n+1}}{1 + \alpha_{n+1}}\right) + \left(\frac{t_n + t_{n-1}}{1 + \alpha_{n+1}}\right)\right]$$

$$\approx S_{n+1} * \left(\frac{E[\varepsilon_{n+1}]}{1 + \alpha_{n+1}}\right) + \left(\frac{E[t_n + t_{n-1}]}{1 + \alpha_{n+1}}\right)$$

Since MinHash is an unbiased estimator of similarity, $E[\varepsilon_{n+1}]=0$, and $E[t_n]$, $E[t_{n-1}]=0$. Hence, $E[t_{n+1}]\approx 0$.

Equation 7 above determines the maximum error in the size estimation of the combination of the first and second files. To make this determination, the one or more processors are further to: determine an actual size of the combination of the first and second files; determine a square of the actual size of the combination of the first and second files; determine a standard deviation of the similarity score of the first and second files; determine a square of the standard deviation of the similarity score; and determine a product of the square of the actual size of the combination of the first and second files and the square of the standard deviation of the similarity score, wherein the maximum error is determined based on the product.

In some embodiments, the one or more processors 304 are to determine, using error determiner 314, a maximum error for the size estimation of the first and second files 302A and 302B, wherein the first and second files are to be combined via deduplication and have at least one shared data segment. Although the description herein describes most of the functionality of the system 300 in terms of combining two files, in many cases, more than two files will be combined via deduplication.

Another application is the hierarchical clustering problem whereby files with certain qualities (characterized in a hierarchy) are preferred to be deduplicated before others. In both applications (combining multiple files without a hierarchy and combining files via hierarchical clustering), the files and data segments therefrom are combined pair-wise at each iteration. The hierarchical clustering problem is described in more detail below.

In some embodiments, deduplication of a plurality of files, and data segments therefrom, may be desired. As described above, it may be desired to deduplicate files based on an established hierarchy such as in the hierarchical clustering problem. In the hierarchical clustering algorithm, the two most similar file objects are combined at each step. The similarity between the file objects can be computed using MinHashes of the file objects and the combined size can be derived using the similarity and the physical sizes of the file objects. At the i-th step of the algorithm, there are n files F1, F2, F3, . . . Fn and the physical sizes |F1|, |F2|, |F3|, . . . |Fn| are known. An additional element is the MinHashes M1, M2, M3, . . . Mn. The similarity between any two files can be computed using the MinHashes, as described above. The most similar two files $F_i$, and $F_j$ are combined to form a new file object $F_{n+1}$. The MinHash $M_{n+1}$ can be computed directly using Mt and Mir. The system of the present disclosure determines the size $|F_{n+1}|$ as well as the MinHash representation of $F_{n+1}$. The same procedure can be repeated until all the files are combined into one object. An example application of the hierarchical clustering algorithm is to identify similar subsets of files from various backup clients.

In such a case, in some embodiments, the one or more processors 304 are further to access at least a third file 302C, in addition to the first file 302A and the second file 302B. The one or more processors are further to determine a second similarity score between the first file and the third file and a third similarity score between the second file and the third file using the MinHash approaches described above. In response to the second similarity score being greater than the third similarity score, the one or more processors are further to determine a second size estimation of the first file 302A and the third file 302C based on the second similarity score. The one or more processors are further to determine a second maximum error of the second size estimation of the first and third files. In response to the second size estimation being less than a size of a destination storage device, the one or more processors are further to deduplicate the first file and the third file to create a combined file and move the combined to the destination storage device, such as storage unit 210.

Figure 3C:
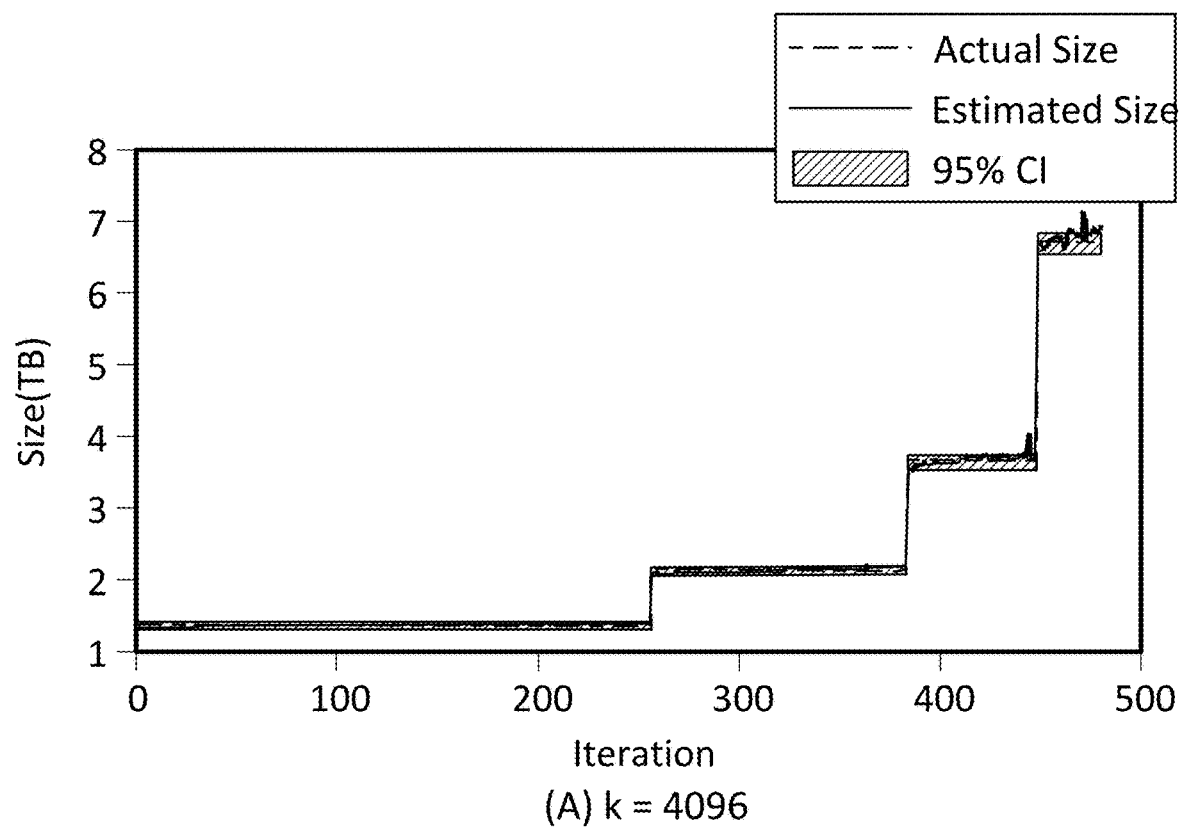
FIG. 3C is a series of charts illustrating validation steps according to one embodiment of the invention.
Figure 3C:
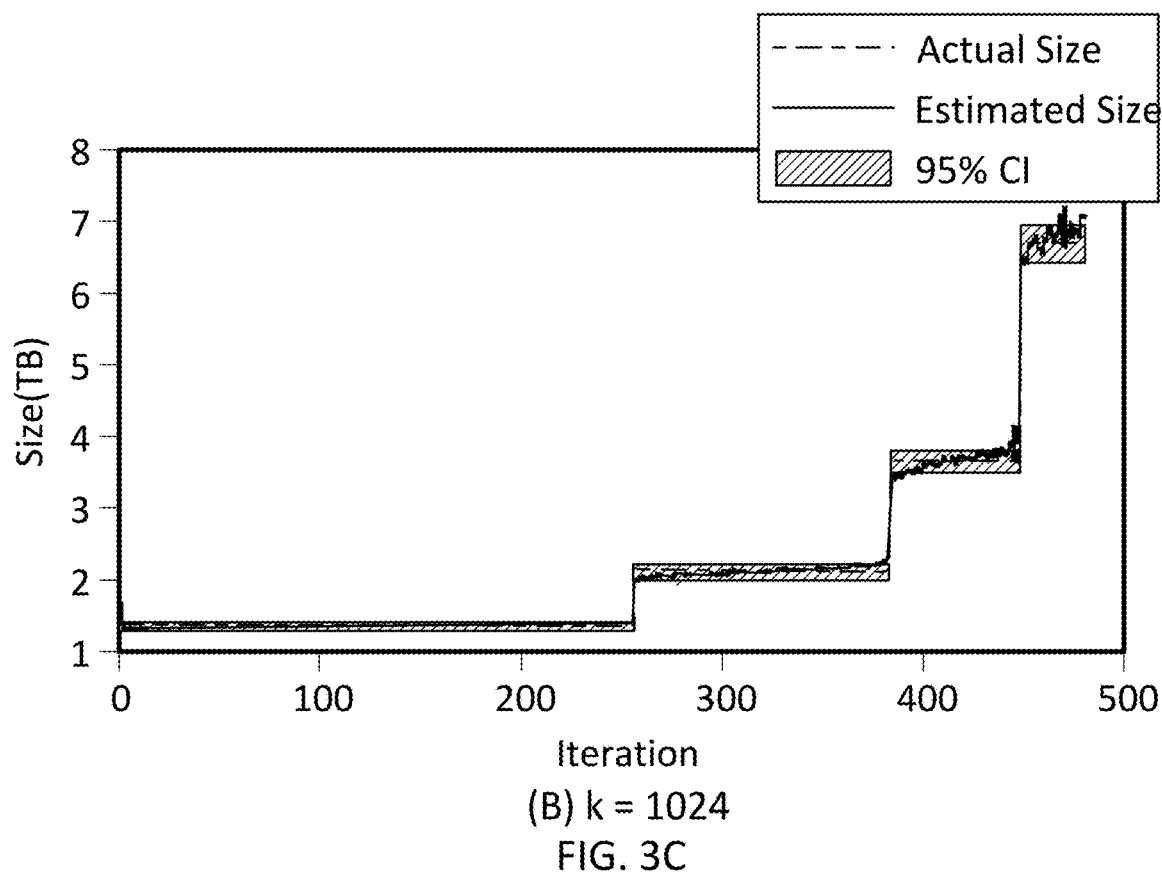
Figure 3C:
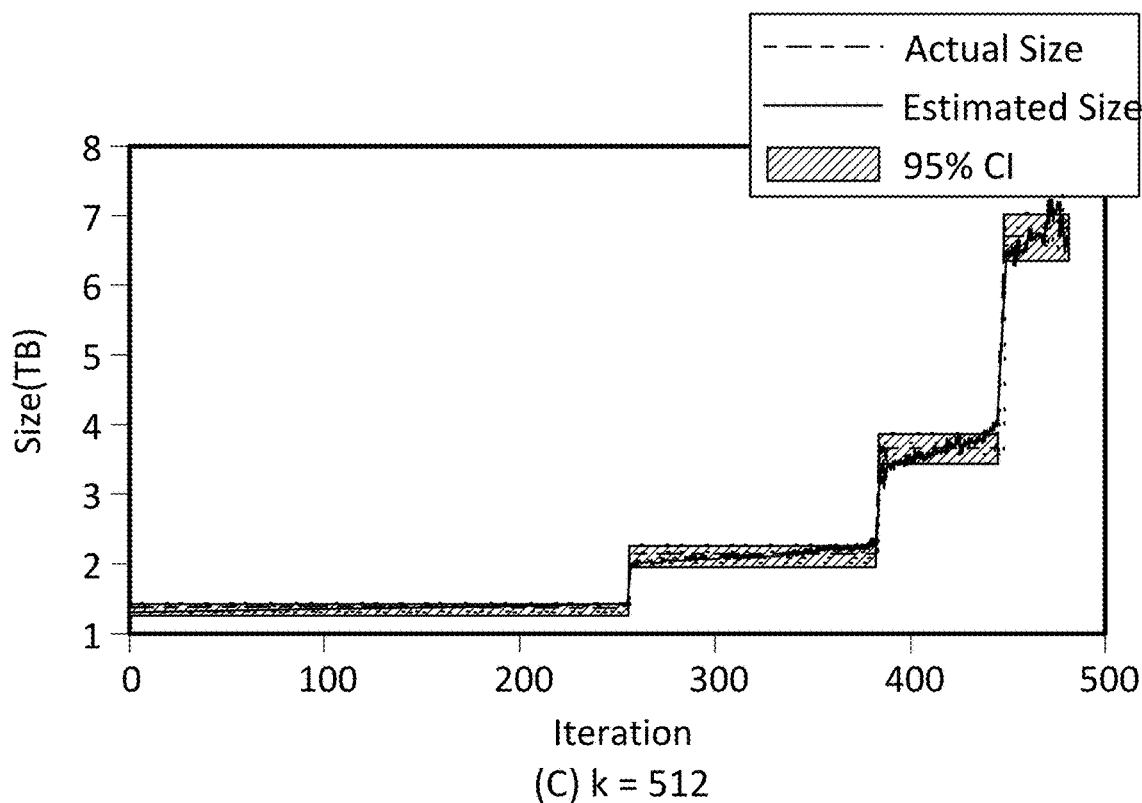
Figure 3C:
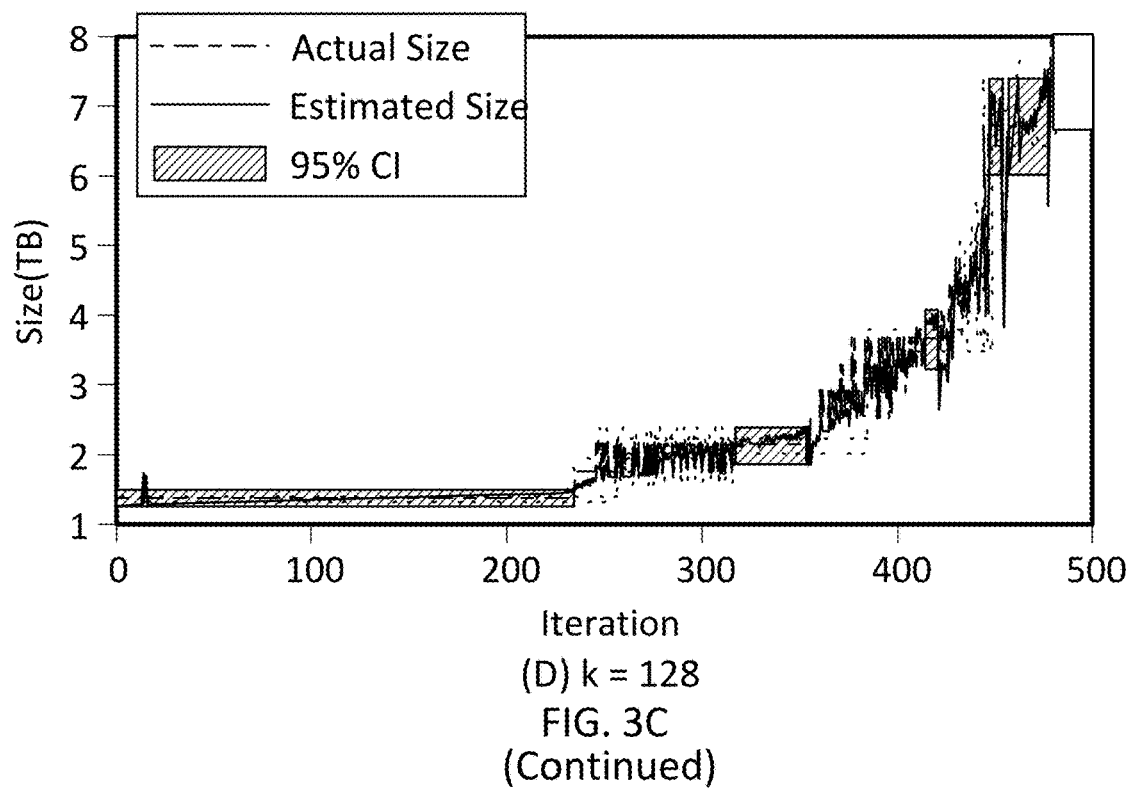

FIG. 3C is a series of charts illustrating validation steps according to one embodiments of the invention. Graphs (a)-(d) represent example validation plots that show the determined estimation above, along with the maximum error is a very good match to the actual size of the combined files. The graphs show validation for combining multiple files in a deduplication setting. The actual size of the union of two files, calculated by using Equation 2 above, is determined and the estimated size of the file using MinHashes as described herein is also determined within a 95% confidence interval. Those calculations over hundreds of iterations are plotted in Graphs (a)-(d). As shown, the validation graphs confirm that the estimated size of the combined files using MinHash is very close compared to the actual size of the files.

Referring back to FIG. 3A, in some embodiments, the one or more processor 304 are further to validate an accuracy of the size estimation. In order to validate the accuracy of the size estimation, the one or more processors are further to determine an actual size of the combination of the first 302A and second 302B files. Additionally, the one or more processors are further to: plot the actual size of the combination and the estimated size of the combination of the first and second files; and calculate and plot a confidence interval of the estimated size of the combination, wherein the confidence interval is based on a standard deviation of the estimated size of the combination determined from the maximum error.

Figure 4:
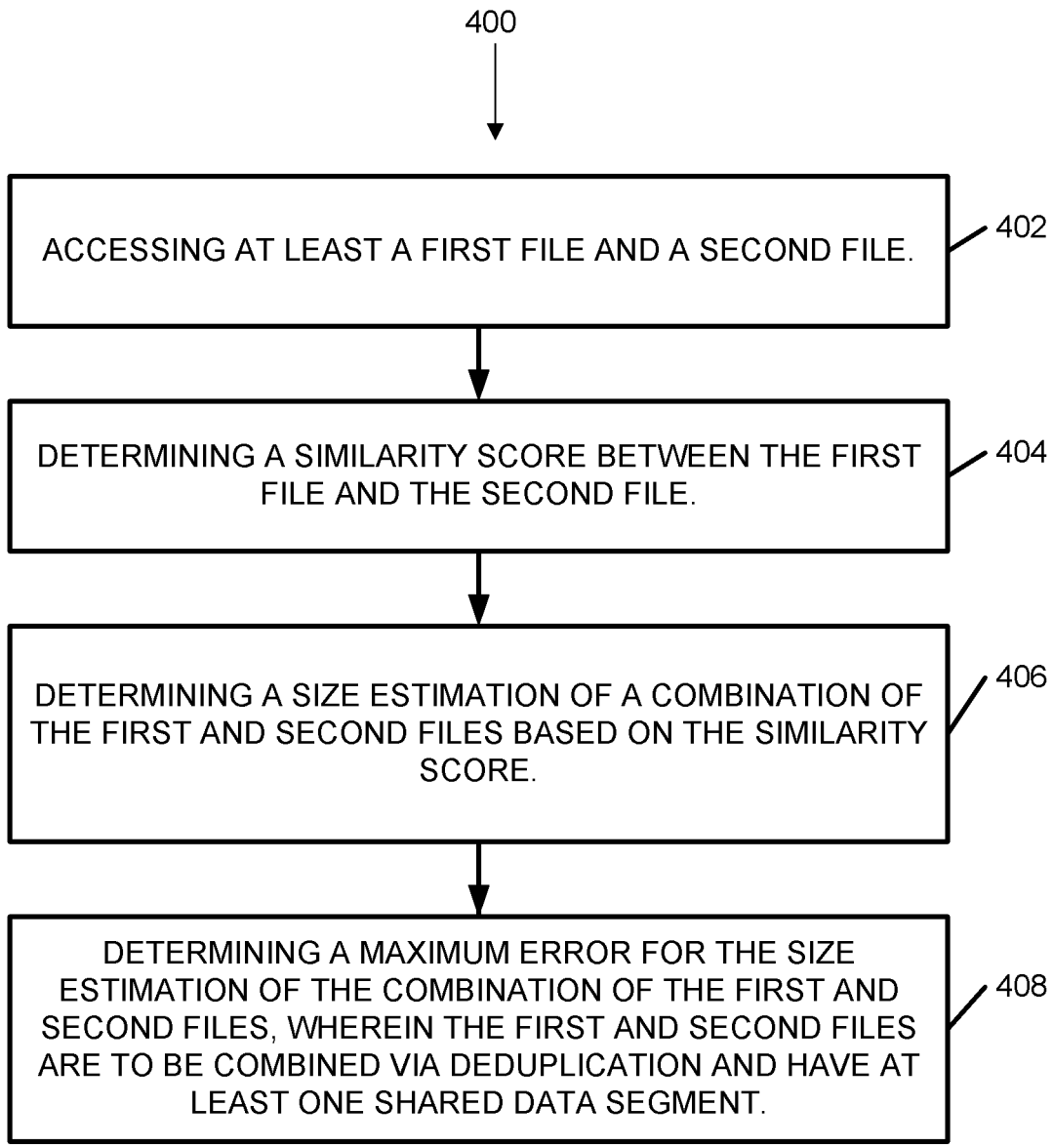
FIG. 4 is a flow diagram of a method for deduplicating at least two files according to one embodiment of the invention.

FIG. 4 illustrates a flow diagram of a method 400 for deduplicating two or more files. In some embodiments, as shown in the first block 402, the method comprises accessing at least a first file and a second file. In some embodiments, as shown in the second block 404, the method comprises determining a similarity score between the first file and the second file. In some embodiments, as shown in the third block 406, the method further comprises determining a size estimation of a combination of the first and second files based on the similarity score. As shown in the fourth block 408, the method further comprises determining a maximum error for the size estimation of the combination of the first and second files, wherein the first and second file are to be combined via deduplication and have at least one shared data segment.

Note that some or all of the components as shown and described above (e.g., one or more processors 304, the deduplication engine/logic 201, etc. of FIG. 3) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
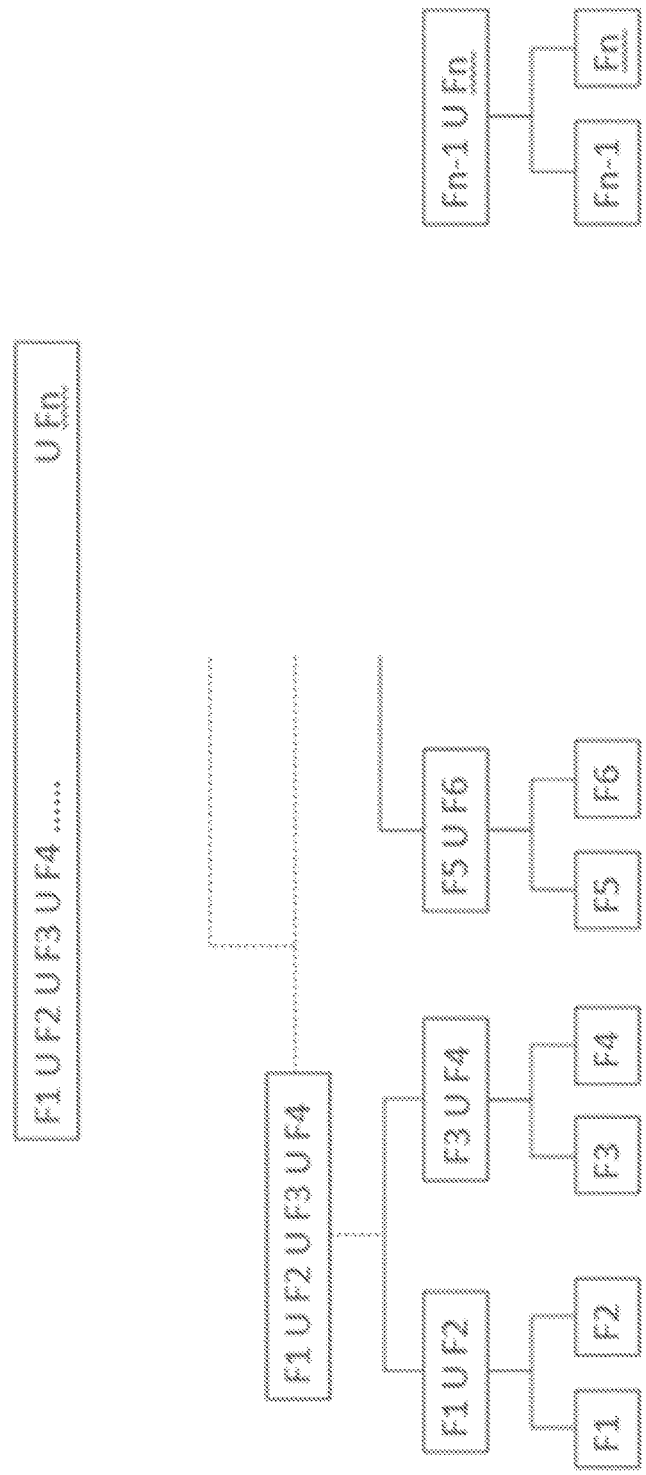
FIG. 5 is a file deduplication tree illustrating how multiple files are deduplicated according to one embodiment of the invention.

FIG. 5 is an illustration of a file deduplication tree 500 showing how multiple files, F1-Fn are deduplicated together logically. In many installations, multiple tenants share the same file system provided by the storage provider. It is important to compute the total size of a collection of files for charge back purposes. Suppose there are n files, F1, F2, . . . Fn. The approaches described herein can be applied to obtain the sizes of F1 U F2, F3 U F4, . . . Fn−1 U Fn. Then the same procedure can be repeated on the unions until the total size of all the files is obtained. A simpler order, e.g. (((F1 U F2) U F3) U F4) . . . Fn, can be employed but the number of steps is the same (n−1). The above hierarchical order is preferred. The benefit of the solutions provided herein is that they solve the deduplication problems presented in many storage contexts, but the disclosed approaches provide a more efficient algorithm. That is, the techniques described herein improve upon existing storage solutions by solving the technical deduplication problems, including determining whether to perform a deduplication and store the deduplicated file in a target storage location, with a faster algorithm than current techniques and with less memory footprint.

Figure 6:
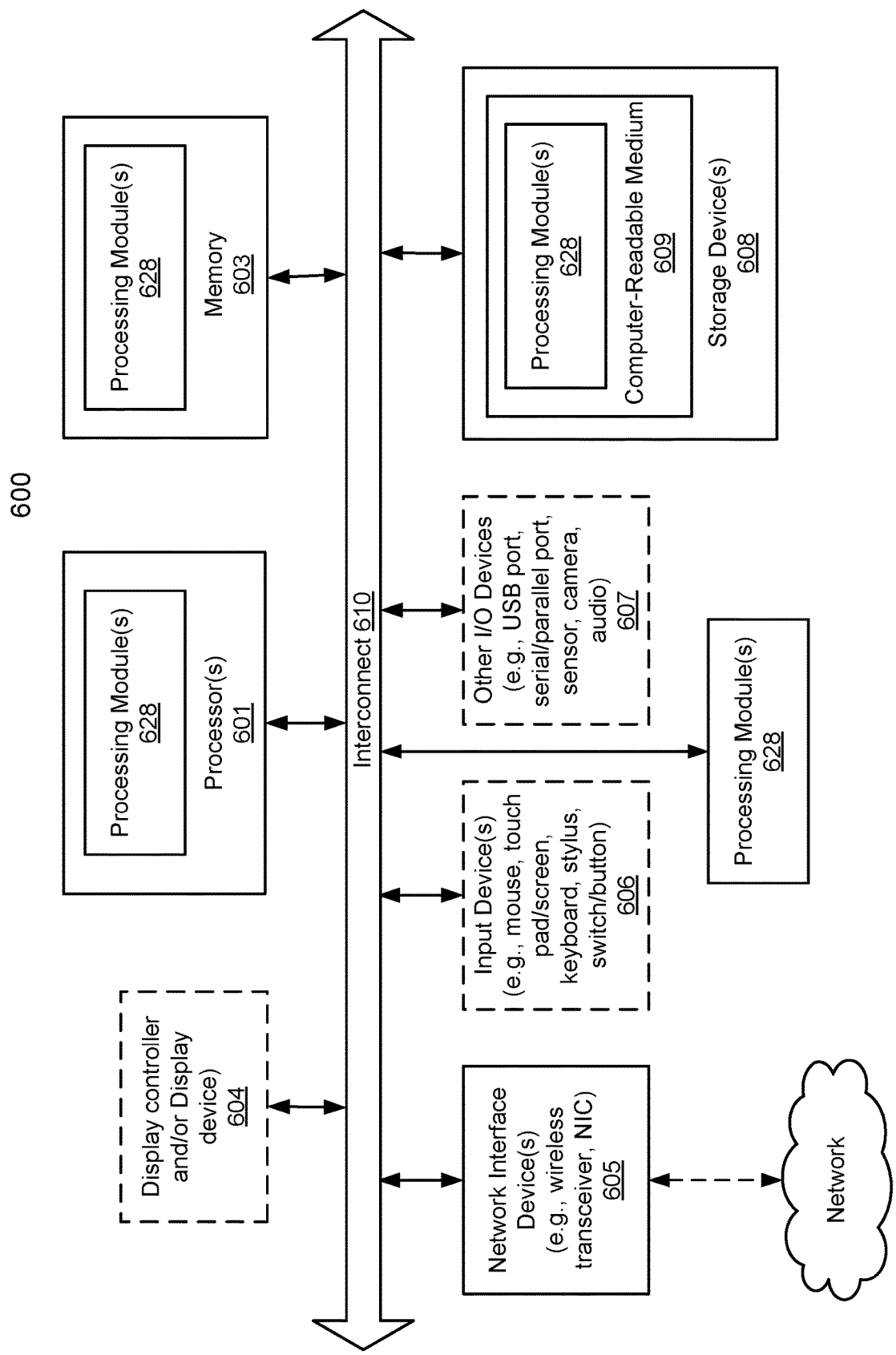
FIG. 6 is a block diagram illustrating a data processing system according to one embodiment.

FIG. 6 is a block diagram illustrating an example of a data processing system which may be used for implementing the system and method described above. For example, system 600 may represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., processing module, unit, and/or logic 628) embodying any one or more of the methodologies or functions described herein. Processing module/unit/logic 628 may represent any of the components described above, such as, for example, a deduplication engine, a system for determining error in size estimation of deduplicated files as described above. Processing module/unit/logic 628 may also reside, completely or at least partially, within memory 603 and/or within processor 601 during execution thereof by data processing system 600, memory 603 and processor 601 also constituting machine-accessible storage media. Processing module/unit/logic 628 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
accessing at least a first file, a second file, and a third file;
applying a hashing algorithm to the first file, the second file, and the third file to obtain a first MinHash value representing the first file, a second MinHash value representing the second file, and a third MinHash value representing the third file;
determining a first similarity score between the first file and the second file based on the first MinHash value and the second MinHash value;
determining a second similarity score between the first file and the third file based on the first MinHash value and the third MinHash value;
determining a third similarity score between the second file and the third file based on the second MinHash value and the third MinHash value, wherein the second similarity score is greater than the third similarity score;
determining a first size estimation of a combination of the first and second files based on the first similarity score;
in response to the second similarity score being greater than the third similarity score, determining a second size estimation of a combination of the first and third files based on the second similarity score, wherein the second size estimation is less than a size of a destination storage device;
in response to the second size estimation being less than the size of the destination storage device, deduplicating the first file and the third file to create a combined file; and
moving the combined file to the destination storage device.

2. The method of claim 1, further comprising validating an accuracy of the first size estimation, wherein validating the accuracy of the first size estimation comprises determining an actual size of the combination of the first and second files,
wherein validating the accuracy of the first size estimation further comprises:
determining a maximum error for the first size estimation of the combination of the first and second files, wherein the first and second files are to be combined via deduplication and have at least one shared data segment;
plotting the actual size of the combination and the first size estimation of the combination of the first and second files; and
calculating and plotting a confidence interval of the first size estimation of the combination, wherein the confidence interval is based on a standard deviation of the first size estimation of the combination determined from the maximum error.

3. The method of claim 1, further comprising determining a maximum error for the first size estimation of the combination of the first and second files, wherein the first and second files are to be combined via deduplication and have at least one shared data segment, wherein the maximum error for the first size estimation is unbiased.

4. The method of claim 1, further comprising determining a Jaccard similarity index of the first and second files based on the first MinHash value and the second MinHash value, wherein the first similarity score corresponds to the Jaccard similarity index.

5. The method of claim 4, wherein determining the first size estimation of the combination of the first and second files comprises:
determining a size of the first file and a size of the second file;
calculating a first summation of the size of the first file and the size of the second file;
calculating a second summation of one and the Jaccard similarity index; and
dividing the first summation by the second summation to thereby obtain the first size estimation of the combination of the first and second files.

6. The method of claim 1, further comprising determining a maximum error for the first size estimation of the combination of the first and second files, wherein determining the maximum error for the first size estimation of the combination of the first and second files comprises:
determining an actual size of the combination of the first and second files;
determining a square of the actual size of the combination of the first and second files;
determining a standard deviation of the first similarity score of the first and second files;
determining a square of the standard deviation of the first similarity score; and
determining a product of the square of the actual size of the combination of the first and second files and the square of the standard deviation of the first similarity score, wherein the maximum error for the first size estimation of the combination of the first and second files is determined based on the product.

7. A system comprising:
one or more processors to:
access at least a first file, a second file, and a third file;
apply a hashing algorithm to the first file, the second file, and the third file to obtain a first MinHash value representing the first file, a second MinHash value representing the second file, and a third MinHash value representing the third file;
determine a first similarity score between the first file and the second file based on the first MinHash value and the second MinHash value;
determine a second similarity score between the first file and the third file based on the first MinHash value and the third MinHash value;
determine a third similarity score between the second file and the third file based on the second MinHash value and the third MinHash value;
determine a first size estimation of a combination of the first and second files based on the first similarity score;
in response to the second similarity score being greater than the third similarity score, determine a second size estimation of a combination of the first and third files based on the second similarity score;
in response to the second size estimation being less than a size of a destination storage device, deduplicate the first file and the third file to create a combined file; and
move the combined file to the destination storage device.

8. The system of claim 7, wherein the one or more processors are further to validate an accuracy of the first size estimation, wherein validating the accuracy of the first size estimation comprises the one or more processors to determine an actual size of the combination of the first and second files, wherein the one or more processors are further to:
determine a maximum error for the first size estimation of the combination of the first and second files, wherein the first and second files are to be combined via deduplication and have at least one shared data segment;
plot the actual size of the combination and the first size estimation of the combination of the first and second files; and
calculate and plot a confidence interval of the first size estimation of the combination, wherein the confidence interval is based on a standard deviation of the first size estimation of the combination determined from the maximum error.

9. The system of claim 7, wherein the one or more processors are further to determine a maximum error for the first size estimation of the combination of the first and second files, wherein the first and second files are to be combined via deduplication and have at least one shared data segment, wherein the maximum error for the first size estimation is unbiased.

10. The system of claim 7, wherein the one or more processors are further to determine a Jaccard similarity index of the first and second files based on the first MinHash value and the second MinHash value, wherein the first similarity score corresponds to the Jaccard similarity index.

11. The system of claim 10, wherein the one or more processors are further to:
determine a size of the first file and a size of the second file;
calculate a first summation of the size of the first file and the size of the second file;
calculate a second summation of one and the Jaccard similarity index; and
divide the first summation by the second summation to thereby obtain the first size estimation of the combination of the first and second files.

12. The system of claim 7, wherein the one or more processors are further to:
determine an actual size of the combination of the first and second files;
determine a square of the actual size of the combination of the first and second files;
determine a standard deviation of the first similarity score of the first and second files;
determine a square of the standard deviation of the first similarity score; and
determine a product of the square of the actual size of the combination of the first and second files and the square of the standard deviation of the first similarity score, wherein a maximum error for the first size estimation of the combination of the first and second files is determined based on the product.

13. A non-transitory computer readable medium, which when executed by one or more processors causes the one or more processors to perform operations comprising:
accessing at least a first file, a second file, and a third file;
applying a hashing algorithm to the first file, the second file, and the third file to obtain a first MinHash value representing the first file, a second MinHash value representing the second file, and a third MinHash value representing the third file;
determining a first similarity score between the first file and the second file based on the first MinHash value and the second MinHash value;
determining a second similarity score between the first file and the third file based on the first MinHash value and the third MinHash value;
determining a third similarity score between the second file and the third file based on the second MinHash value and the third MinHash value;
determining a first size estimation of a combination of the first and second files based on the first similarity score;
in response to the second similarity score being greater than the third similarity score, determining a second size estimation of a combination of the first and third files based on the second similarity score;
in response to the second size estimation being less than a size of a destination storage device, deduplicating the first file and the third file to create a combined file; and
moving the combined file to the destination storage device.

14. The non-transitory computer readable medium of claim 13, further comprising validating an accuracy of the first size estimation, wherein validating the accuracy of the first size estimation comprises determining an actual size of the combination of the first and second files,
wherein validating the accuracy of the first size estimation further comprises:
determining a maximum error for the first size estimation of the combination of the first and second files, wherein the first and second files are to be combined via deduplication and have at least one shared data segment;
plotting the actual size of the combination and the first size estimation of the combination of the first and second files; and
calculating and plotting a confidence interval of the first size estimation of the combination, wherein the confidence interval is based on a standard deviation of the first size estimation of the combination determined from the maximum error.

15. The non-transitory computer readable medium of claim 13, wherein the operations further comprise determining a maximum error for the first size estimation of the combination of the first and second files, wherein the first and second files are to be combined via deduplication and have at least one shared data segment, wherein the maximum error for the first size estimation is unbiased.

16. The non-transitory computer readable medium of claim 13, wherein the operations further comprise determining a Jaccard similarity index of the first and second files based on the first MinHash value and the second MinHash value, wherein the first similarity score corresponds to the Jaccard similarity index.

17. The non-transitory computer readable medium of claim 16, wherein determining the first size estimation of the combination of the first and second files comprises:
determining a size of the first file and a size of the second file;
calculating a first summation of the size of the first file and the size of the second file;
calculating a second summation of one and the Jaccard similarity index; and
dividing the first summation by the second summation to thereby obtain the first size estimation of the combination of the first and second files.

18. The non-transitory computer readable medium of claim 13, wherein the operations further comprise determining a maximum error for the first size estimation of the combination of the first and second files.

19. The non-transitory computer readable medium of claim 18, wherein determining the maximum error for the first size estimation of the combination of the first and second files comprises:
- determining an actual size of the combination of the first and second files;
- determining a square of the actual size of the combination of the first and second files;
- determining a standard deviation of the first similarity score of the first and second files;
- determining a square of the standard deviation of the first similarity score; and
- determining a product of the square of the actual size of the combination of the first and second files and the square of the standard deviation of the first similarity score, wherein the maximum error for the first size estimation of the combination of the first and second files is determined based on the product.

\* \* \* \* \*